United States Patent
Eybergen

[11] Patent Number: 5,727,304
[45] Date of Patent: Mar. 17, 1998

[54] CONDUIT FAST CONNECTION

[75] Inventor: William N. Eybergen, Dutton, Canada

[73] Assignee: Eaton Corporation, Cleveland, Ohio

[21] Appl. No.: 668,590

[22] Filed: Jun. 19, 1996

[51] Int. Cl.⁶ .................................................. B23P 11/02
[52] U.S. Cl. ........................ 29/525.04; 29/451; 29/453
[58] Field of Search .................... 285/137.11, 139.1, 285/139.2, 139.3, 141.1, 142.1; 29/450, 451, 453, 525.01, 525.02, 525.04

[56] References Cited

U.S. PATENT DOCUMENTS

| | | | |
|---|---|---|---|
| 2,819,099 | 1/1958 | Rittle | 285/137.11 |
| 3,031,049 | 4/1962 | Somville | 29/453 X |
| 3,291,495 | 12/1966 | Liebig | 29/453 X |
| 4,225,161 | 9/1980 | Smith | 285/137.11 |
| 4,407,531 | 10/1983 | Raush et al. | 285/142.1 |
| 4,672,732 | 6/1987 | Ramspacher et al. | 29/453 X |
| 5,093,976 | 3/1992 | Malinow et al. | 29/525.04 X |
| 5,163,716 | 11/1992 | Bolton et al. | 285/142.1 |
| 5,228,725 | 7/1993 | Aoyagi et al. | 285/141.1 |

*Primary Examiner*—Daniel Moon
*Attorney, Agent, or Firm*—Roger A. Johnston

[57] ABSTRACT

A conduit, to be attached to a fluid port in a block or wall, has an enlarged end with a sealing ring and an attachment plate with a cut-out engaging the enlarged end, preferably with the plate secured against the enlarged end by a retaining ring or convolution. The plate has an attachment hole with a snap ring in the hole which is snap-locked onto a barbed stud threaded into the block retaining the enlarged conduit end in the fluid port. The conduit is disconnected by unthreading the stud through the plate hole from the block.

13 Claims, 2 Drawing Sheets

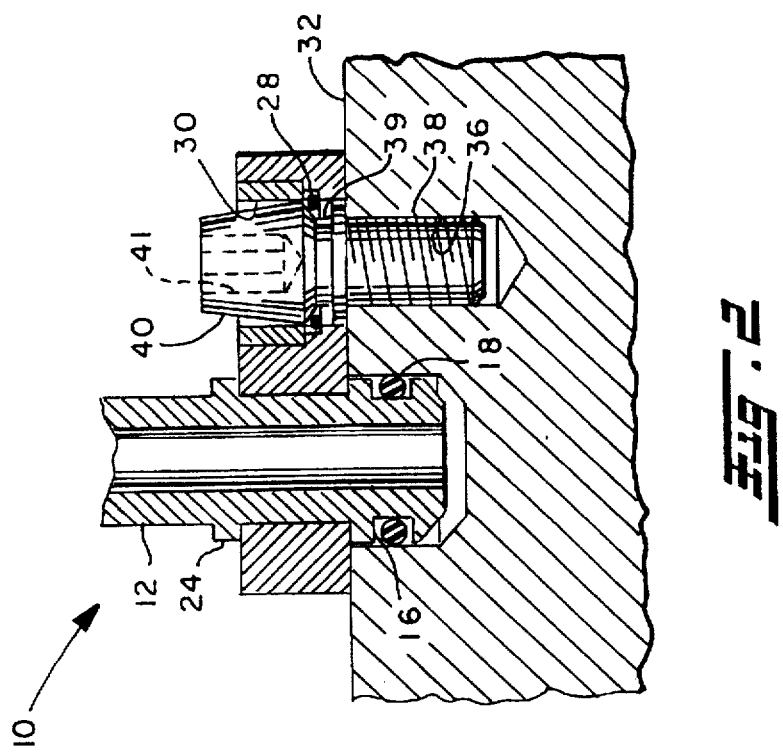
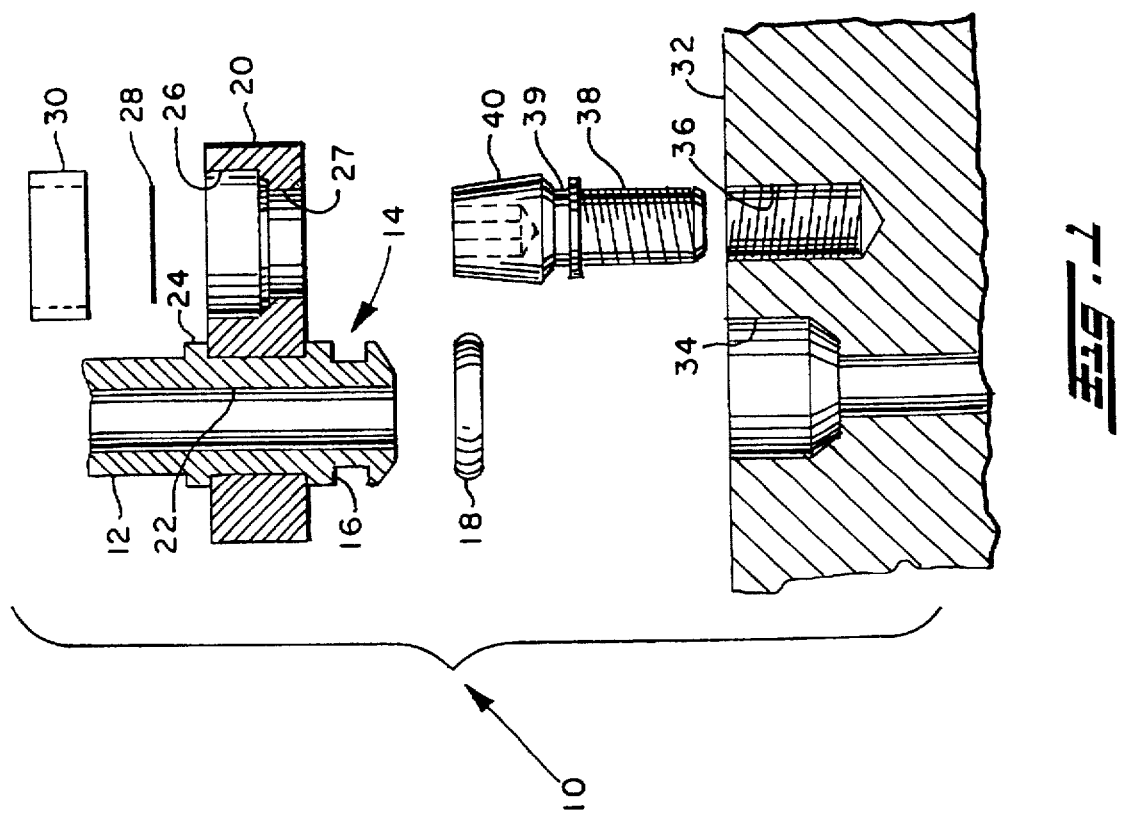

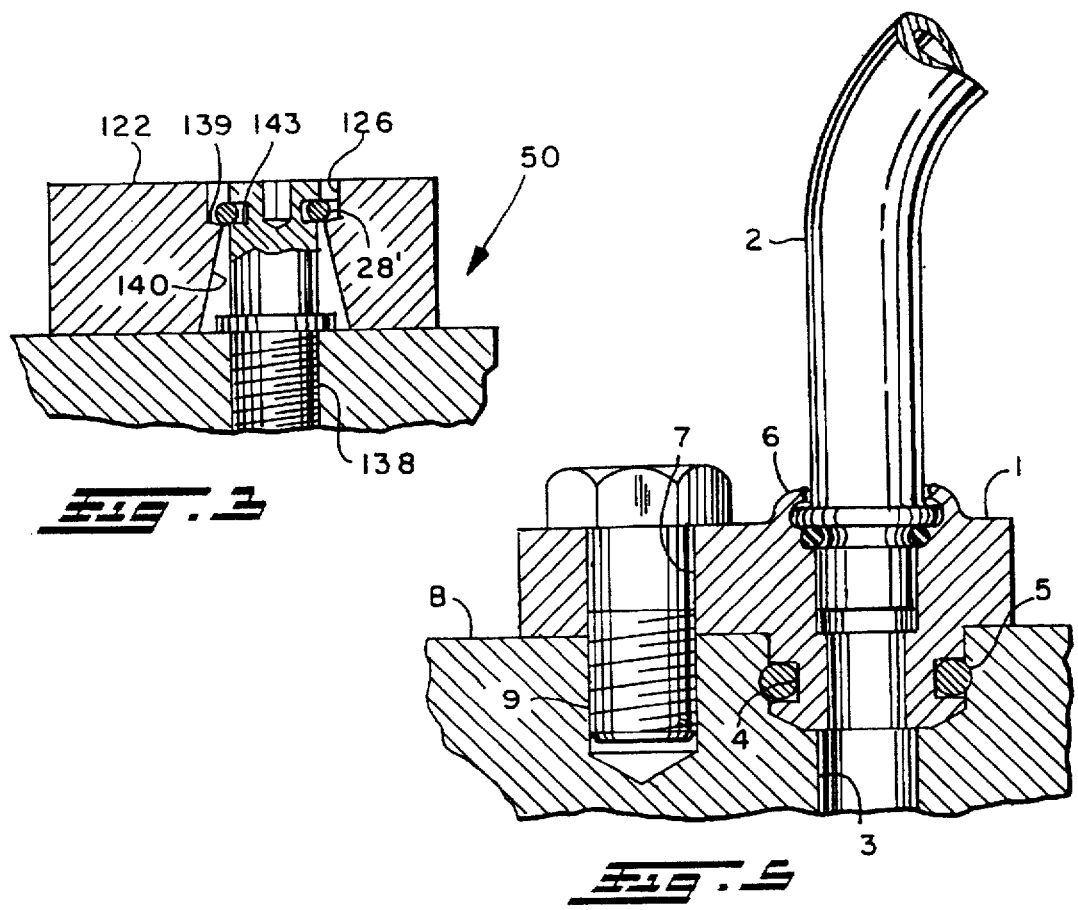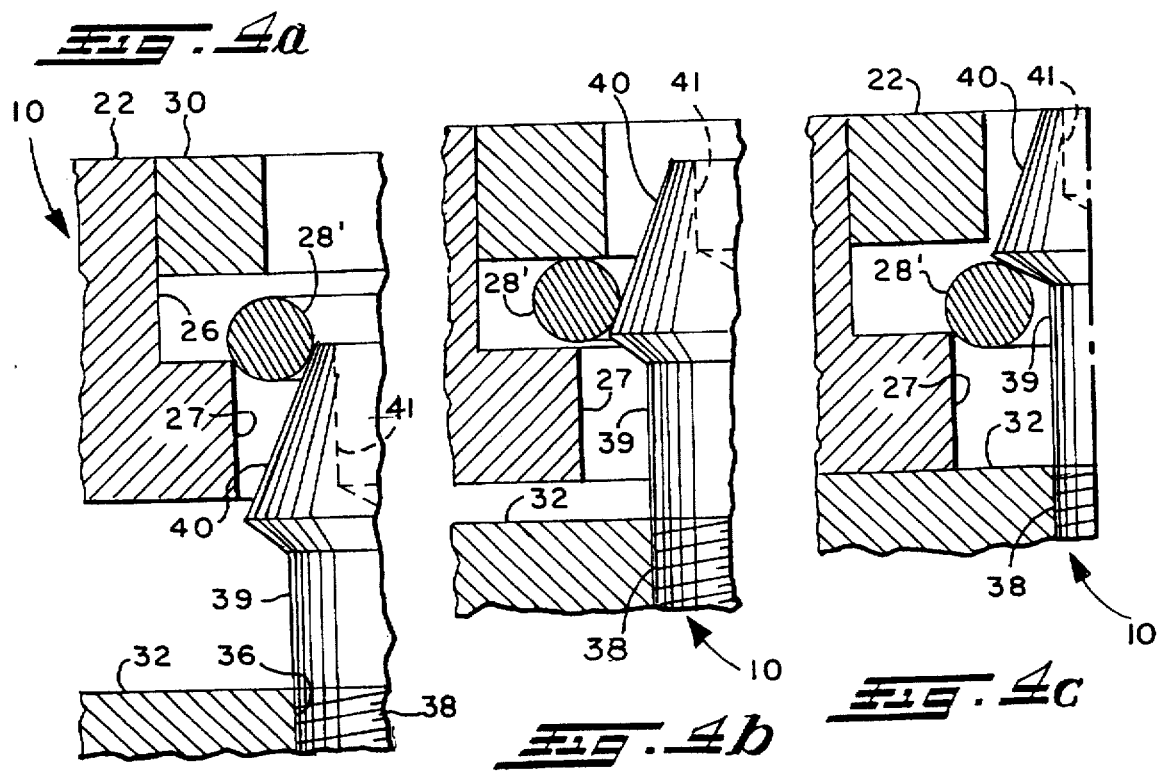

5,727,304

CONDUIT FAST CONNECTION

BACKGROUND OF THE INVENTION

The present invention relates to conduit attachments and particularly conduit employed for communicating flow of pressurized refrigerant and the connection of such conduits to a wall or block such as in a refrigerant expansion valve or receiver/drier header. The present invention relates to the fast or quick connection of refrigerant conduits to a wall or block and particularly relates to such quick connection in the assembly and installation of automotive passenger compartment air conditioning systems in high-volume mass production.

Heretofore, it has been the practice in installing air conditioning conduits in automotive mass production to utilize a connection of the type having a connector plate attached to the end of the refrigerant conduit to be connected; and, the connector plate is fastened to the block or wall having a fluid connecting port for connection to the conduit, the attachment being made typically by threaded fasteners such as a machine screw or bolt received through the plate.

The aforesaid known type of conduit connection employed for refrigerant conduits attached to a port in a block or wall B is shown in FIG. 5 where a plate 1 is attached to the conduit 2 and is sealed in a port 3 by means of a protrusion 4 on the plate having an annular seal ring 5 received in the port. The conduit 2 is attached to the plate by a crimped flange 6; and, a separate hole 7 is provided in the plate for attachment to the block by means of a suitable threaded fastener 9.

The aforesaid manner of attachment of a refrigerant conduit to a port formed on a block or wall has thus required the threading and tightening of a bolt during installation. This bolt installation has been found troublesome in high-volume mass production where, due to the orientation of the system components in the engine compartment, the installer has limited access to the bolt. In such typical installations it is difficult to engage the bolt head with appropriate tools for tightening the bolt. Thus, it has been desired to provide a quick or fast connection for the refrigerant conduit to a block port without the need of any separate fasteners or tools.

SUMMARY OF THE INVENTION

The present invention provides a quick or fast connection of a conduit to a port in a block or wall and is particularly suitable for quick connection of conduits to such a port for flow of pressurized refrigerant through the conduit to the port. The present invention has particular applicability to the assembly and installation of refrigerant conduit in automotive air conditioning systems where it is desired to provide a quick connect without the need for separate fasteners or tools of a conduit to a port in a block or wall of a system component in high-volume mass production.

The present invention provides a conduit having an enlargement or protrusion on the conduit end to be connected to the port. An attachment plate has a cut-out therein with the conduit received in the cut-out and contacting the enlargement. Preferably the conduit is secured thereto by a pair of convolutions or rings formed on the conduit. A pre-assembled stud is releasably fastened to the block or wall adjacent the fluid port; and, a separate cut-out or aperture in the plate is received over the stud and snap-locked thereon with the enlarged end of the conduit being simultaneously inserted and sealed in the port. The snap-locking is preferably accomplished by a snap ring provided in the plate aperture which is snapped over an undercut or barb provided on the stud. If it is desired subsequently to remove the connection, the stud may be removed such as by unthreading from the block or wall and the plate and conduit removed.

The present invention thus provides a unique and novel technique for assembling a fluid pressure conduit to a port in a block or wall with a quick connect or snap-lock attachment over a stud which makes the connection between the conduit and the fluid port and retains the conduit secured therein without separate tools or fasteners. The connection may thereafter be broken or disconnected by unthreading the stud.

BRIEF DESCRIPTION OF THE DRAWINGS

FIG. 1 is an exploded view of the conduit connection of the present invention;

FIG. 2 is a view of the components of FIG. 1 in the assembled condition;

FIG. 3 is an alternate arrangement of the embodiment of FIG. 2;

FIG. 4(a) is a view similar to FIG. 1 illustrating the initiation of the sequence of assembly of FIG. 2;

FIG. 4(b) is a view similar to FIG. 1 showing partial assembly;

FIG. 4(c) is a view similar to FIG. 2 showing completion of the assembly sequences; and, FIG. 5 is a view similar to FIG. 1 of the prior art connection.

DETAILED DESCRIPTION

Referring to FIGS. 1 and 2, the conduit connection of the present invention is indicated generally at 10 and includes a conduit or tube 12 having an enlarged end indicated generally at 14 and which has an annular groove 16 formed thereon into which is received an annular seal ring 18. An attachment plate 20 has a cut-out formed therein which may either be an aperture or an open slot into which the conduit 12 is received.

In the presently preferred practice an annular ring 24 is received over the conduit 12 and secured thereto for retaining the conduit in the cut-out 22. However, alternatively ring 24 may be formed integrally in the tube wall as a convolution, as may the enlarged end 14.

Although the presently preferred practice has the conduit secured to the plate 22 by a second enlargement, convolution or ring 28, it will be understood that, in its simplest form the invention may be practiced with only the single enlargement 14.

Attachment plate 20 has a second cut-out or aperture 26 with a reduced diameter portion 27 and formed therein spaced from the cut-out 22 with a resilient snap ring 28 received therein and retained by a collar or ring 30 pressed in the aperture 26. Ring 28 is shown in FIG. 2 as having a rectangular cross section, but a circular cross section ring may also be employed.

A block or wall 32 such as the block of an expansion valve or header of a receiver/drier, has a fluid port 34 formed therein which is sized and configured to have received therein the enlarged end 14 of conduit 12 in a manner such that seal ring 18 is compressed in groove 16 and a fluid pressure tight seal is formed therebetween.

A bore 36 is formed in block 32 spaced from port 34 by an amount to coincide with aperture 26. Bore 36 has a stud 38 releasably and preferably threadedly engaged therein; and, the portion of stud 38 extending externally of the bore 36 is provided with a taper 40 and an undercut or relief is provided adjacent the largest diameter of the taper thereby forming an annular barb on the stud. It will be understood that stud 38 is provided pre-assembled to the block 32 and is tus in place at the time of the connection of conduit 12.

Referring to FIG. 4(a), the conduit connection of the present invention is shown at the beginning of installation. In FIGS. 4(a), (b) and (c) the invention is shown using an alternative configuration for the snap ring 28' having a circular transverse section. In FIG. 4(a) the tapered portion 40 of the stud 38 is illustrated as inserted into the aperture 26 to a point where it initially contacts the snap ring 28'.

Referring to FIG. 4(b), the plate 22 has been moved downwardly an additional amount from the position shown in FIG. 4(a) until the taper 40 of the stud 38 has expanded the snap ring 28' to its greatest diameter and to a condition where it is at incipient snap-over of the taper 40.

Referring to FIG. 4(c), the plate 22 has been moved downwardly to contact the upper surface of block 32 and the tapered portion 40 of stud 38 has passed through the snap ring 28' which has now contracted or snapped into the undercut region 39 of the stud 38 such that ring 28' prevents removal of the plate by the engagement of the reduced diameter portion 27 of aperture 26 with the ring 28'.

If it is subsequently desired to remove the conduit from engagement with the port 34, the stud 38 may be removed by insertion of a tool (not shown) such as an Allen wrench or hexagonal bit into the socket 41 through the plate aperture 26 and the stud unthreaded from block 32.

Referring to FIG. 3, an alternate embodiment of the invention is indicated generally at 50 as having the adaptor plate 122 formed with a conically tapered portion in the aperture 126 and an undercut 139 formed adjacent the smallest diameter of the tapered portion 140 thereby forming an internal annular barb. A stud 138 has the upper portion thereof formed with a straight cylindrical configuration; and, an annular groove 143 is formed thereon into which snap ring 28' is engaged and resiliently compressible therein such that the ring 28' may pass through the tapered portion 140 and expand into undercut 126 an amount sufficient to retain the plate 122 on the stud 138.

The present invention thus provides a novel and unique quick or fast connection for a conduit for communicating pressurized fluid to a port formed in a block or wall. A connection plate secured to the conduit is snap-locked over a tapered stud provided in releasable, preferably threaded engagement with the block or wall. Subsequent disconnection of the conduit is enabled by unthreading of the stud from the block or wall.

Although the present invention has hereinabove been described with respect to the illustrated embodiments, it will be understood that the invention is capable of modification and variation and is limited only by the of the following claims.

We claim:

1. A method of connecting a tubular conduit to a wall or block for flowing pressurized fluid therethrough comprising:
   (a) forming a protrusion or enlargement on an end of a tubular conduit;
   (b) providing an attachment plate and forming a cut-out therein and forming an aperture therein spaced from said cut-out;
   (c) disposing said conduit in said cutout;
   (d) forming a fluid pressure port in said wall and inserting said enlargement in said port and sealing therebetween;
   (e) providing a stud and releasably securing said stud to said wall or block; and,
   (f) disposing a resiliently deflectable member between said stud and aperture and inserting said stud in said aperture and deflecting said resilient member and retaining said plate on said block or wall and said conduit in said port.

2. The method defined in claim 1, wherein said steps of disposing a resiliently deflectable member includes forming an undercut or relief and inserting a spring therein.

3. The method defined in claim 1, wherein said step of releasably securing said stud includes threadedly engaging said stud with said block or wall.

4. The method defined in claim 1, wherein said step of sealing between said port and said enlargement includes forming an annular groove in said conduit enlargement and disposing a resilient ring therein.

5. The method defined in claim 1, further comprising releasing said stud from said block and disconnecting said conduit from said port.

6. The method defined in claim 1, wherein said step of forming an enlargement includes forming at least one convolution in the wall of said conduit.

7. A method of releasably quick-connecting a fluid pressure conduit to a port in a block or wall comprising:
   (a) removably mounting a stud on said block spaced from said port;
   (b) forming an enlargement or protrusion on an end of said conduit and inserting said enlargement in said port;
   (c) providing an attachment plate and forming a cut-out in said plate and an aperture spaced from said cut-out;
   (d) disposing said conduit in said cut-out and contacting said enlargement with said plate;
   (e) releasably securing a stud to said block or wall and inserting said stud in said plate aperture and retaining said plate on said stud; and,
   (f) removing said stud for disconnecting said conduit from said port.

8. The method defined in claim 7, wherein said step of removably mounting a stud includes threadedly engaging said stud in said block.

9. The method defined in claim 7, wherein said step of inserting said enlargement includes disposing a seal between said enlargement and said port.

10. The method defined in claim 7, wherein said step of inserting said stud includes snap-locking.

11. The method defined in claim 7, wherein said step of retaining said plate on said stud includes disposing a spring member in said aperture and deflecting said spring member.

12. The method defined in claim 7, wherein said step of disposing said conduit in said cut-out includes securing said conduit to said plate.

13. The method defined in claim 7, wherein said step of disposing said conduit in said cutout includes forming a pair of convolutions in the wall of said conduit and securing said conduit to said plate.

* * * * *